Figure 1:
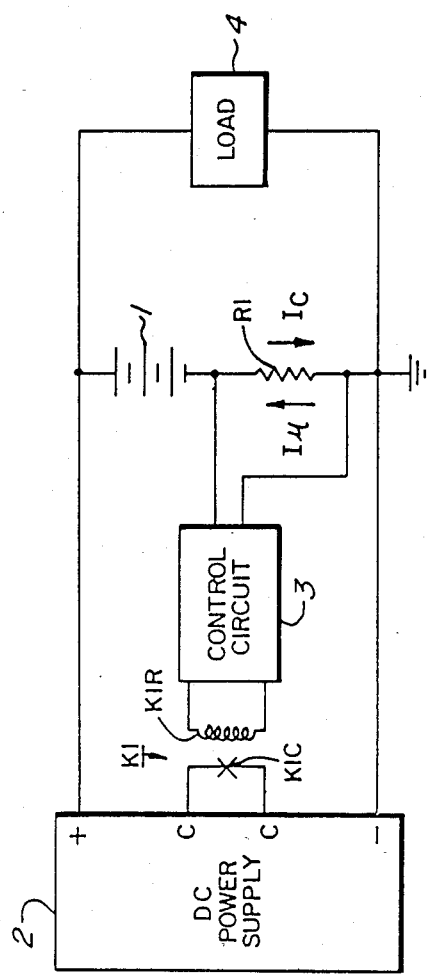

United States Patent [19]

Kotlarewsky

[11] Patent Number: 4,562,398
[45] Date of Patent: Dec. 31, 1985

[54] BATTERY MAINTENANCE APPARATUS
[75] Inventor: Paul Kotlarewsky, Nepean, Canada
[73] Assignee: Mitel Corporation, Kanata, Canada
[21] Appl. No.: 575,527
[22] Filed: Jan. 31, 1984
[30] Foreign Application Priority Data
  Jun. 8, 1983 [CA] Canada ................................ 429,935
[51] Int. Cl.⁴ ............................................. H02J 7/04
[52] U.S. Cl. ...................................... 320/31; 320/21; 320/38; 320/40
[58] Field of Search .................. 320/21, 31, 37, 38, 320/39, 40

[56]  References Cited
  U.S. PATENT DOCUMENTS
  4,395,672  7/1983  Gassaway ............................. 320/31

Primary Examiner—Peter S. Wong
Assistant Examiner—Anita M. Ault
Attorney, Agent, or Firm—Laff, Whitesel, Conte & Saret

[57] ABSTRACT

A method and apparatus is disclosed for automatic control of battery maintenance including fast recharge and equalizing of the voltages on individual cells of the battery. The charging current through a resistance in series with the battery is monitored, and in response, a control circuit energizes a relay which controls the output voltage of a power supply used to charge the battery and drive a load. The control circuit includes a clock, connected to a recharge counter, which effects the recharge process for a predetermined period of time. The recharge counter is connected to the relay which regulates the output voltage of the power supply. The control circuit also includes a battery current sensor, which monitors the charging current of the battery, and a second counter, which provides an enabling signal to the relay for initiating a longer cycle which equalizes the charges on individual cells of the battery if the battery has been recharged from a severely discharge state.

17 Claims, 2 Drawing Figures

BATTERY MAINTENANCE APPARATUS

This invention relates to a method and apparatus for charge maintenance and continuous charging of a storage battery and more particularly, to charging apparatus wherein d.c. voltage is applied to the battery to be charged through a controllable switch.

Charged batteries are frequently charged at a low float charging current so as to balance or oppose a small drain current generated by the battery through a load. When the battery loses charge the drain current decreases and the battery draws a greater amount of float charging current.

Battery charging systems have been devised for automatically recharging batteries while protecting the systems against high current flow. The charging current is often regulated in such systems through some type of phase control circuit for varying the portion of an a.c. cycle during which charging occurs, according to the existing charge on the battery.

An automatic battery charging system has heretofore not been known wherein effective current limiting circuitry is provided for protecting the charging system, particularly against high current surges experienced when the battery is severely discharged and hence demands a high charging rate.

In most automatic battery chargers, the charging rate is regulated according to the current in the output circuit of a d.c. charging circuit or the primary circuit of an a.c. transformer; such circuits have been found to be inadequate and only operate properly while the battery voltage is within about 20% of its normal charge. Below this level such circuits have been found to cease functioning or else the charger has been found to shut off or go out of synchronization until a circuit breaker is tripped or a fuse blows to protect the circuit.

Substantially charged batteries frequently generate a small drain current through a load. Automatic battery chargers according to the prior art usually lack circuitry for compensating effectively for this drain current from the charged battery. Some automatic battery chargers have controlled rectifiers for transmitting charging current to the battery being charged according to signals generated in a phase control circuit. The latter circuit generally employs a capacitive device which is charged and discharged according to the voltage in the battery. However, when the battery is fully charged, a small amount of drain current is generated and the capacitive device is found to charge and discharge randomly, out of synchronization with the a.c. source, resulting in the drain current not being compensated for effectively.

Another shortcoming of existing battery chargers is their failure to equalize the charge in the respective cells of the battery being charged.

It is known that the cells of a battery tend to discharge or leak at varying rates, causing their individual voltages to vary. For instance, the ideal voltage for a 6 cell, 12 volt lead-acid battery is 2.17 volts per cell. As a result of variation in cell voltage, the more highly charged cells generate more gas and use more water. Therefore battery manufacturers often recommend that batteries should be slightly over-charged to equalize the charge on each cell.

Prior art chargers have been found unable to charge a severely discharged battery smoothly with perfect synchronization between the charging current and the phase control circuit.

The present invention provides a battery charger for charging a discharged battery in a controlled and accurate manner regardless of the charge on the battery, while preventing damage to the charger from excessive current.

The present invention provides a battery charger which is able to charge a battery uniformly at a rate inversely proportional to the charge on the battery.

The present invention also provides a battery charger which applies a low float charging current to the battery so as to balance and compensate for the opposing drain current generated by the battery.

Further, the present invention charges a multi-cell battery so as to equalize the charge on the respective cells.

In addition, the battery charger of this invention compensates for drain current from a substantially charged battery. It provides an inexpensive, accurate and completely automatic float, fast recharge and equalize control for a wide size range of power supply system, or battery and load combinations.

The invention, in general is a battery maintenance apparatus for maintaining the charge in a battery connected across a source of battery charging current, comprising apparatus for monitoring the sum of the drain and float charging currents of the battery, apparatus for controlling repetitive recharging of the battery at a high charging rate for successive first time periods in the event the float charging current is greater than a predetermined level. The battery maintenance apparatus is comprised also of an apparatus for controlling recharging of the battery for a second time period which is much greater than any of the first time periods in the event the battery has been recharged a predetermined number of times for the predetermined first time periods.

The invention is, more particularly, a battery maintenance apparatus for maintaining charge in a battery comprising a source of battery charging current for the battery having a voltage control input for causing a high current battery charging rate if enabled and a lower current float charging rate if not enabled. The battery maintenance apparatus further includes a resistor for connection in series with the battery and a load, and a control circuit including a current sensing circuit connected to the resistor for monitoring the sum of a float charging current and a drain current of the battery. The control circuit enables the source of battery charging current for the first predetermined period of time, constituting a recharge cycle, in the event the float charging current is higher than a predetermined threshold. The control circuit also enables the source of battery charging current for a second predetermined period of time significantly longer than the first predetermined period of time in the event a predetermined number of recharge cycles have occurred.

The invention is also a method for automatic control of battery maintenance comprised of applying a nominal charging current to a battery, monitoring the float charging current of the battery to determine if it is discharged, providing a recharge cycle if the battery is discharged consisting of charging the battery at a high voltage for the first predetermined period of time, and providing an equalize cycle for the second predetermined period of time consisting of applying the high voltage to the battery for a period of time longer than that of the recharge cycle for unifying the voltages on the individual cells if a predetermined number of recharge cycles have been performed.

Figure 2:
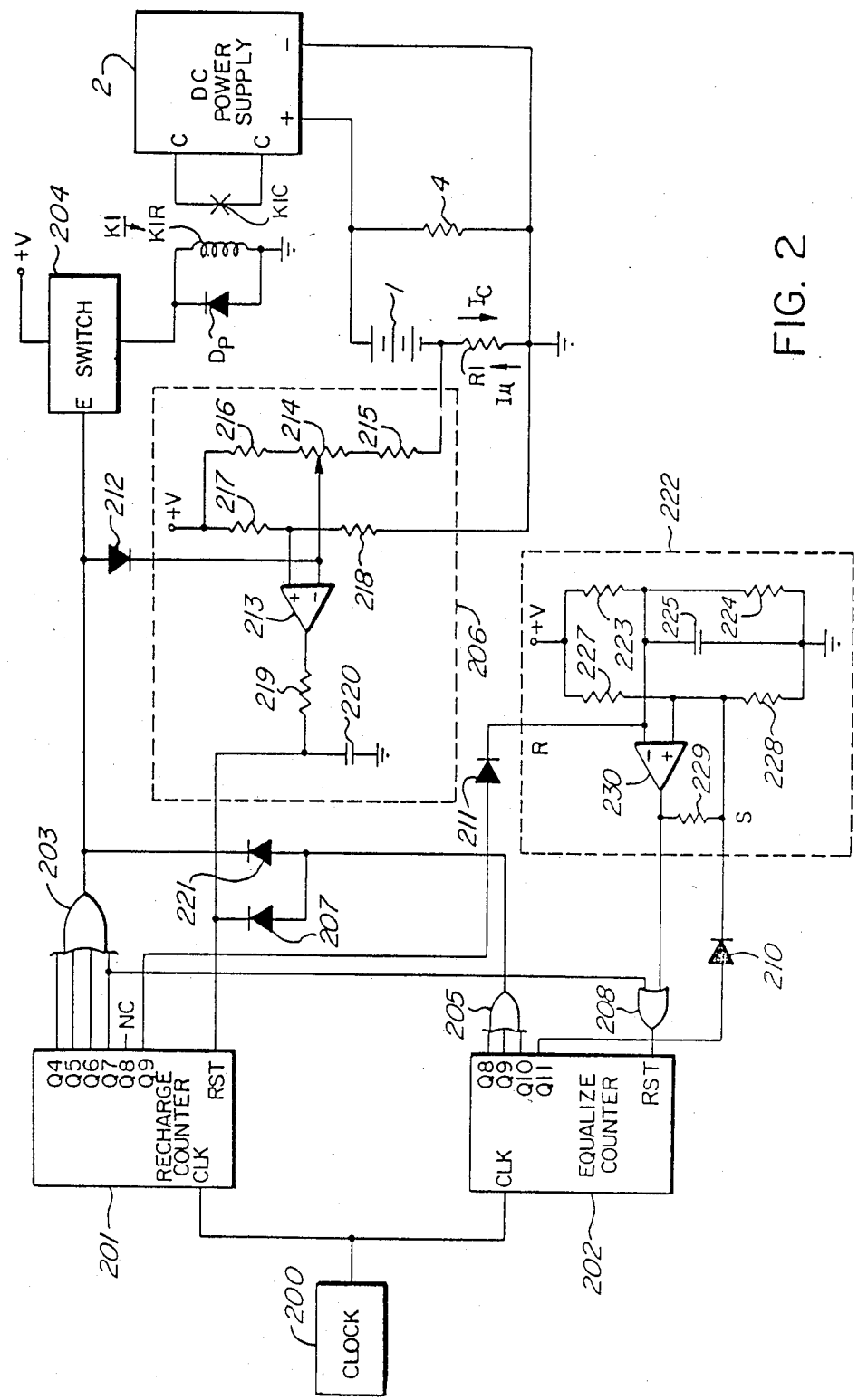
Figure 3:
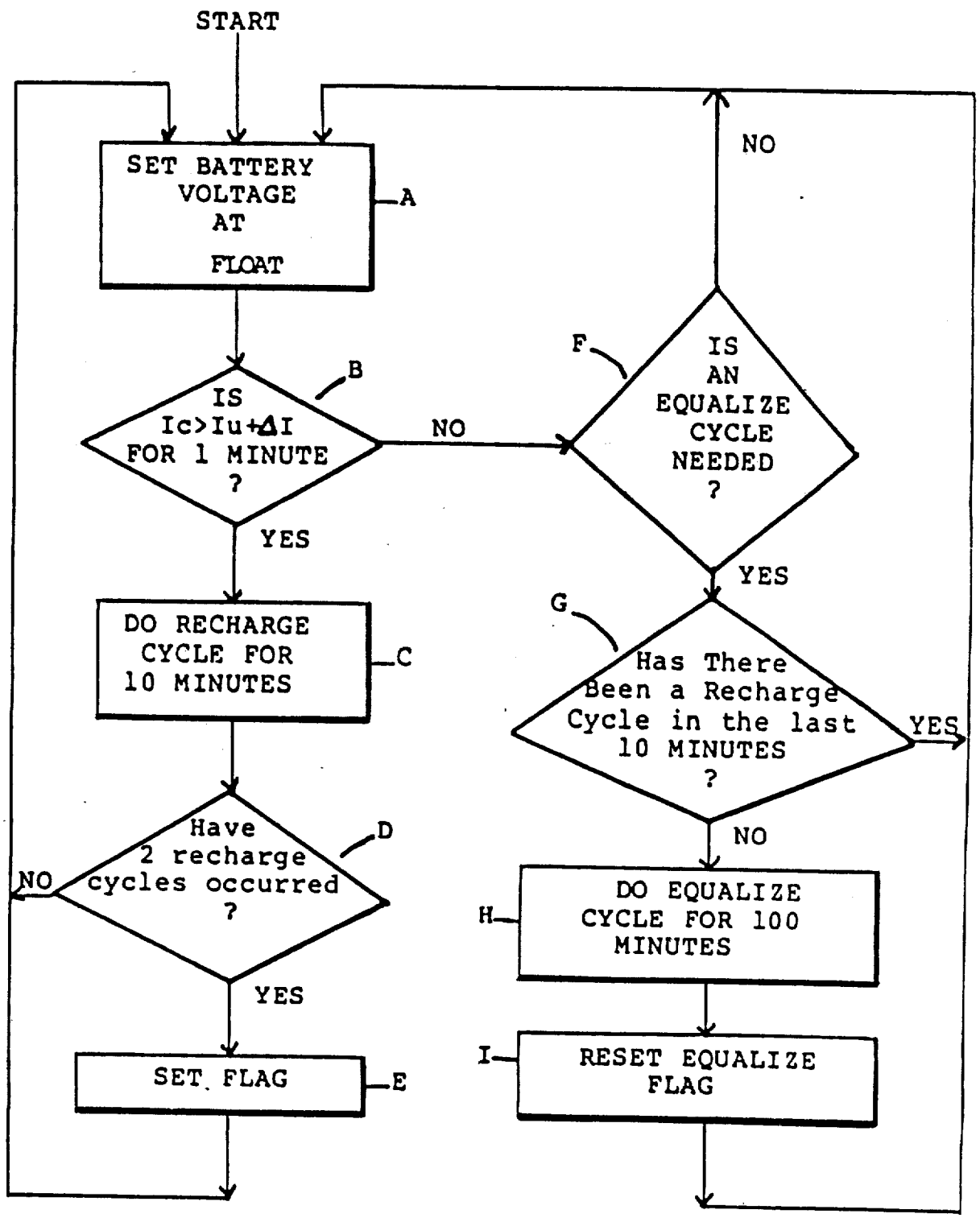

A better understanding of the invention will be obtained by reference to the detailed description below, in conjunction with the following drawings, in which:

FIG. 1 is a block diagram of a battery charging system according to the present invention, FIG. 2 is a schematic diagram of a circuit according to the preferred embodiment of the invention and FIG. 3 is a flow chart of the method of fast charging and equalizing of batteries according to the preferred form of the invention.

Referring to the block diagram of FIG. 1, one embodiment of a battery charging system according to the present invention is shown for charging a battery 1, which includes a D.C. power supply 2 connected across the battery 1 in series with a resistance R1. The input of a control circuit 3 is connected across the resistance R1, and the coil K1R of a relay K1 is connected to the output of the control circuit. The make contacts K1C of the relay are connected to a control input C of the power supply 2. When the contacts are closed, the power supply increases its output voltage to a charging level, in a well known manner.

The charging current for the battery passing through R1 is sensed by the control circuit 3, which operates relay K1 under conditions to be described below. The relay controls the output voltage of the power supply 2. The battery 1 will be floated, recharged or equalized depending on its state of discharge.

A flow chart for the method of automatic control of fast charging and equalizing of batteries according to the preferred form of the invention, particularly of control circuit 3, is illustrated in FIG. 3.

Assume that the battery 1 of FIG. 1 is normally floated at a charging rate which just balances the normal residual drain current of the cells (step A). The control circuit senses whether the float charging current Ic is greater than the opposing drain current Iu by a predetermined threshold $\Delta I$ for one minute (if $Ic > Iu + \Delta I$) (Step B), and if so, it intiates a recharge cycle (Step C), by closing relay K1. The initial 1 minute sense period is provided to guard against false triggering due to transients or noise in the system.

The recharge cycle (step C) consists of charging the battery at a high voltage for a predetermined period which depends on the type of battery. For the present example, for lead-acid batteries, the period is preferred to be 10 minutes. The charging current through resistance R1 is subsequently monitored for 1 minute at float voltage, whereby it is determined whether the float charging current (Ic) is still greater than the predetermined threshold, ($Ic > Iu + \Delta I$), (step B). If so, relay K1 is closed, and the recharge cycle is repeated as often as necessary to fully charge the battery. If two or more cycles are required (Step D), indicating a deeply discharged battery, an equalize flag is set indicating the need for an equalize cycle (Step E). If equalizing is needed (step F) a 10 minute delay period is inserted following the last recharge cycle (step G), and relay K1 is closed for a long period to establish an equalize cycle (step H), which lasts preferably 100 minutes.

The 10 minute delay following the preceding recharge cycle is utilized to provide time for stabilization of the battery before equalization. When the equalizing cycle is finished the equalize flag is cleared (step I) and the battery is floated normally.

Referring now to the schematic diagram in FIG. 2, a control circuit constructed in accordance with the present invention is illustrated.

A clock circuit 200 of well known design is connected to the clock input of a counter 201 (recharge counter) having consecutive outputs Q4, Q5, Q6 and Q7 connected to corresponding inputs of OR gate 203. The output of OR gate 203 is connected to an enable input of a switch 204, which for example can be a transistor. Switch 204 is connected between a positive supply voltage +V for the circuit and a coil K1R, of relay K1, which is also connected to ground. A protective diode $D_p$ is connected across the coil K1R in a well known manner.

The output of OR gate 203 is also connected through diode 212 to an inverting input of operational amplifier 213. The non-inverting input is held at a fixed voltage between voltage source +V and ground which appears at the junction of resistors 217 and 218 in series, which forms a voltage divider network. The inverting input of operational amplifier 213 is connected to a tap of a potentiometer 214, the other two terminals of which are connected via respective resistors 216 and 215 to +V and the junction of resistor R1 and the return terminal of battery 1 respectively. The output of operational amplifier 213 is connected through resistor 219 to the reset input of recharge counter 201, and through bypass capacitor 220 to ground. The combination of resistor 219 and capacitor 220 forms a low pass filter preferably with a time constant of approximately two seconds.

In operation, when the float charging current $I_c$ exceeds a predetermined threshold level set by potentiometer 214, the portion of the voltage generated across R1 which is applied to the inverting input of operational amplifier 213 is greater than the voltage at the non-inverting input. The output of operational amplifier 213 goes low, thus enabling the recharge counter 201 to count clock pulses from clock 200. It should be noted that the voltage across R1 is caused by the float charging current $I_c$ less the drain current $I_u$. In the preferred embodiment, counter 201 is a fourteen stage binary counter. The clock rate should be such that after approximately one minute, the outputs of the counter will be:

| Q9, | Q8, | Q7, | Q6, | Q5, | Q4 |
|---|---|---|---|---|---|
| 0 | 0 | 0 | 0 | 0 | 1 |

The output of OR gate 203 goes high thus enabling the switch 204 which allows current to flow through the relay coil K1R. This starts the first recharge cycle.

OR gate 203 can be simply an appropriate number of diodes (e.g. 4) having their anodes connected to respective outputs of the counter 201 and having cathodes which are connected together, the latter forming the output of the gate.

The logic high voltage output from OR gate 203 is applied to the inverting input of operational amplifier 213, thus causing the output of the amplifier 213 and consequently the reset input RST of the counter 201 to be held low, allowing the counter to continue counting uninterrupted.

After approximately ten minutes the outputs of the counter will be:

| Q9, | Q8, | Q7, | Q6, | Q5, | Q4 |
|---|---|---|---|---|---|
| 0 | 0 | 1 | 1 | 1 | 1 |

On the next clock transition, outputs Q4, Q5, Q6 and Q7 go low, the resulting output of OR gate 203 goes low thus disabling switch 204 and terminating the first recharge cycle. Also, the logic high voltage output from OR gate 203 is removed from the inverting input of operational amplifier 213, and if the float charging current is now less than the predetermined threshold the output of operational amplifier 213 goes high and as a result counter 201 stops counting. However, if the float charging current $I_c$ is still greater than the predetermined threshold level, i.e. the battery is not fully recharged, the output of operational amplifier 213 remains low thus allowing counter 201 to continue counting, thereby starting a second recharge cycle.

The low pass filter provided by the combination of resistor 219 and capacitor 220 safeguards against erroneous transients being applied to the reset input of counter 201. For example if counter 201 is not counting and there is a momentary surge in charging current Ic, due perhaps to a sudden variation in the load, the output of operational amplifier 213 will momentarily go low. However charge stored on capacitor 220 holds the reset input of counter 201 at a logic high voltage. In the preferred embodiment, the combination of resistor 219 and capacitor 220 effectively filters out erroneous outputs of up to approximately two seconds duration from operational amplifier 213.

At the end of the second recharge cycle, the outputs of the counter will be:

| Q9, | Q8, | Q7, | Q6, | Q5, | Q4 |
|---|---|---|---|---|---|
| 0 | 1 | 1 | 1 | 1 | 1 |

On the next clock transition outputs Q4, Q5, Q6, Q7 and Q8 of counter 201 go low, and output Q9 simultaneously goes high. The switch 204 is thus disabled terminating the second recharge cycle, and the logic high voltage is removed from the inverting input of operational amplifier 213 as described above. If the float charging current is still greater than the predetermined level, the output of the operational amplifier 213 remains low, thus initiating a third recharge cycle. This process of reinitiating recharge cycles would continue until such time as the battery is fully recharged.

Output Q9 is connected through diode 211 to the reset input R of a one bit memory 222. Memory 222 can be a S-R latch, a Schmitt trigger or any like apparatus for storing one bit of data.

In the preferred embodiment shown, memory 222 is comprised of an operational amplifier 230 which, with associated circuitry to be described, forms a Schmitt trigger. When the circuit is initially powered up, positive voltage appears on the non-inverting input of operational amplifier 230 which is connected through respective input resistors 227 and 228 to +V and ground respectively. The inverting input of operational amplifier 230 is connected through resistors 223 and 224 to +V and ground respectively, the latter resistors having similar values to corresponding resistors 227 and 228 respectively. After a predetermined period of time a capacitor 225, which is connected between the inverting input of amplifier 230 and ground, charges up to the same voltage as the non-inverting input. Because the non-inverting input is initially more positive than the inverting input, the output of the amplifier 230 goes to a high logic voltage which is positively fed back to the non-inverting input through a resistor 229 connected therebetween. The output of amplifier 230 will remain high until a sufficiently high voltage appears on the R lead connected to the inverting input of operational amplifier 230, at which time the output voltage of amplifier 230 swings negative and is fed back to the non-inverting input. The output of amplifier 230 is thus held at a low voltage.

When output Q9 of counter 201 goes high, memory 222 is thereby reset thus storing a logic zero flag signal.

The output of memory 222 (from amplifier 230) is connected to one input of OR gate 208. The other input of OR gate 208 is connected to the Q7 output of the recharge counter 201. The output of OR gate 208 is connected to the reset input RST of a second counter 202 referred to herein as an equalize counter. Equalize counter 202 receives clock pulses from clock circuit 200 whereby when the output of OR gate 208 is low, it counts in tandem with the recharge counter 201.

Outputs Q8, Q9 and Q10 of equalize counter 202 are respectively connected to the inputs of OR gate 205, the output of which is connected to the enable input E of switch 204 through diode 221, and to the reset input RST of recharge counter 201 through a buffer diode 207.

In operation, when memory 222 is reset by output Q9 of counter 201 going high, and when output Q7 of recharge counter 201 is low, the output of OR gate 208 goes low thus enabling equalize counter 202. Because output Q9 of recharge counter 201 goes high at the same instant outputs Q4 and Q7 go low, equalize counter 202 begins counting in tandem with counter 201. If the battery is not yet fully charged, recharge counter 201 will continue counting. After approximately ten minutes, output Q7 of counter 201 goes high thus resetting equalize counter 202 through OR gate 208. If, however, the battery is fully charged, recharge counter 201 stops counting as described earlier, and equalize counter 202 continues counting for approximately ten minutes at which time its output Q8 goes high.

As a result, a logic high voltage appears at the output of OR gate 205, which is applied to the enable input E of switch 204, thus enabling switch 204 whereby coil K1R is energized and an equalize cycle is initiated. The logic high voltage at the output of OR gate 205 is applied through diode 207 to the reset input RST of the recharge counter 201 thus ensuring that output Q7 remains low, allowing equalize counter 202 to continue counting uninterrupted for an additional approximately 100 minutes, after which time outputs Q8, Q9 and Q10 of counter 202 go low and its output Q11 goes high.

When outputs Q8, Q9 and Q10 of counter 202 go low, the output of OR gate 205 goes low and switch 204 is as a result caused to open thus terminating the equalize cycle. Output Q11 of counter 202 simultaneously goes high thus applying a logic high voltage through diode 210 to the set input S of the memory 222. The output of the memory consequently goes high thus resetting the equalize counter 202 through OR gate 208 until such time as output Q9 of the recharge counter 201 again goes high.

In summary, power supply 2 provides a float charging current Ic to balance the drain current $I_u$ from battery 1. When battery 1 is discharged it draws a greater amount of float charging current than when it is fully charged. Current sensing circuit 206 senses this increase and, if float charging current Ic is greater than a predetermined threshold, provides an output to enable counter 201.

Counter 201 is provided with timing pulses from clock 200 at a rate such that after approximately one minute a certain one of a group of consecutive outputs of counter 201 goes high thus enabling the switch 204 to provide a circuit path for energizing coil K1R and initiating a recharge cycle. Counter 201 counts for approximately ten minutes during which at least one of the group of consecutive outputs is high keeping switch 204 enabled. After approximately ten minutes all of the group of consecutive outputs go low thus disabling switch 204 and terminating the recharge cycle.

This process of sensing the charging current for one minute, and recharging the battery for ten minutes is repeated until such time as the battery is fully charged.

If a predetermined number of consecutive recharge cycles have occurred, counter 201 provides an output (referred to herein as a flag signal) to memory circuit 222. In the preferred embodiment the predetermined number of consecutive recharge cycles is two.

An enable signal is applied to counter 202 from memory unit 222 as the flag signal is stored therein. Counter 202 thus starts counting in tandem with counter 201. If no recharge cycle has occurred for approximately ten minutes one of a group of consecutive outputs of counter 202 goes high thus enabling switch 204 and initiating an equalize cycle. Counter 202 counts for an additional approximately 100 minutes during which at least one of the group of its consecutive outputs remain high whereby switch 204 remains enabled. After approximately one hundred minutes all of the group of consecutive outputs of counter 202 go low thus disabling switch 204 and terminating the equalize cycle, and counter 202 provides an output to reset memory 222.

It will be apparent to those skilled in the art that numerous alterations and modifications can be made to the preferred embodiment without departing from the spirit and scope of the present invention. For example, in certain circumstances it may be advantageous to alter the duration of the recharge cycle for successive repetition thereof. For example the first recharge cycle can be of one minute duration, the second recharge cycle can be of five minutes duration, the third recharge cycle can be of ten minutes duration, and so forth. Furthermore, it may be advantageous in certain circumstances to provide an additional switch and an additional relay. Switch 204 is enabled by counter 201 in the described manner to initiate a recharge cycle. However, the additional switch could be enabled by counter 202 so as to provide a current path for energizing the additional relay whereby a pair of contacts of the additional relay are connected to additional control inputs of power supply supply 2 for initiating the application of an equalizing voltage to the battery which is distinct from the output voltage applied to the battery during the recharge cycle.

Although the foregoing is set forth as a full and complete description of the disclosed embodiment of the present invention, it will be apparent to those skilled in the art that numerous alterations and modifications may be made therein without departing from the spirit and the scope of the present invention as defined in the following claims.

I claim:

1. A battery maintenance apparatus for maintaining charge in a battery connected across a source of battery charging current, comprising:
   (a) means for monitoring a sum current comprised of battery drain current and float charging current of the battery;
   (b) means for controlling repetitive recharging of the battery at a high charging rate for first predetermined time periods in the event the monitored sum current is greater than a predetermined level; and
   (c) means for controlling recharging of the battery for a second predetermined time period which is much greater than any of the first predetermined time periods in the event the battery has been recharged a predetermined number of times for said predetermined first time periods.

2. A battery maintenance apparatus as defined in claim 1, in which said recharge controlling means includes means for causing continuation of the repetitive charging for said first predetermined time periods until the monitored sum current is less than said predetermined level.

3. A battery maintenance apparatus as defined in claim 2 further including means for initiating a first one of said first predetermined time periods after a first predetermined delay time period, and for causing successive ones of said first predetermined time periods to follow successive ones of said first predetermined delay time period.

4. A battery maintenance apparatus as defined in claim 2 further including means for causing said second predetermined time period to follow a predetermined second delay time period which follows a last one of said first predetermined time periods.

5. A battery maintenance apparatus as defined in claim 2, in which said recharge controlling means further includes means for causing said second predetermined time period to follow a last one of said first predetermined time periods.

6. A battery maintenance apparatus as defined in claim 5 further including means for initiating a first one of said first predetermined time periods after a first predetermined delay time period, and for causing successive ones of said first predetermined time periods to follow successive ones of said first predetermined delay time period.

7. A battery maintenance apparatus as defined in claim 5 further including means for causing said second predetermined time period to follow a predetermined second delay time period which follows a last one of said first predetermined time periods.

8. A battery maintenance apparatus as defined in claim 1 further including means for initiating a first one of said first predetermined time periods after a first predetermined delay time period, and for causing successive ones of said first predetermined time periods to follow successive ones of said first predetermined delay time period.

9. A battery maintenance apparatus as defined in claim 1 further including means for causing said second predetermined time period to follow a predetermined second delay time period which follows a last one of said first predetermined time periods.

10. A battery maintenance apparatus for maintaining charge in a battery, comprising:
(a) a source of battery charging current for said battery having a voltage control input for causing a high current battery charging rate if enabled and a lower current float charging rate if not enabled;
(b) resistance means for connection in series with said battery and a load; and
(c) a control circuit, including current sensing means connected to said resistance means for monitoring the sum of a float charging current and a drain current of the battery, for enabling said source of battery charging current for a first predetermined period of time, constituting a recharge cycle, in the event the float charging current is higher than a predetermined threshold, and for enabling said source of battery charging current to provide an equalize cycle for a second predetermined period of time significantly longer than the first predetermined period of time in the event a predetermined number of recharge cycles have occurred.

11. A battery maintenance apparatus as defined in claim 10 wherein said control circuit includes means for enabling said source of battery charging current for successive first predetermined periods of time, each constituting a recharge cycle, in the event the float charging current is higher than the predetermined threshold for a predetermined first delay time period, and wherein said source of battery charging current is enabled to provide said equalize cycle for the second predetermined period of time in the event no recharge cycle has occurred within a predetermined second delay time period and a predetermined number of consecutive recharge cycles has occurred.

12. A battery maintenance apparatus as defined in claim 11 in which the control circuit further includes a relay, and means for energizing the relay whereby a pair of contacts of the relay are operated to enable the source of battery charging current.

13. A battery maintenance apparatus as defined in claim 12 wherein the control circuit further includes:
(a) a switch means for providing a circuit path for energizing said relay, when enabled,
(b) clock means for providing a train of timing pulses,
(c) a first counter means connected to said current sensing means and said clock means for generating said predetermined first and second delay time periods, and for generating the first output signal for enabling said switch means for said first predetermined period of time in the event the float charging current is greater than said predetermined threshold for said predetermined first delay time period, and for generating a flag signal if said predetermined number of consecutive recharge cycles have occurred,
(d) memory means for storing said flag signal, and
(e) a second counter means connected to said memory means, said clock means, and the first counter means for generating a second output signal for enabling the switch means for said second predetermined period of time, and for disabling the first counter if no recharge cycle has occurred within said predetermined second delay time period and said flag signal is stored, and for generating a reset signal for resetting said memory means after said second predetermined time period.

14. A method for automatic control of battery maintenance comprised of:
(a) applying a nominal charging current to a battery,
(b) monitoring the sum of a float charging current and a drain current of the battery to determine if it is in excess of a predetermined threshold, indicating a discharged battery,
(c) providing a recharge cycle if the battery is discharged, consisting of charging the battery at a high voltage for a first predetermined period of time, and
(d) providing an equalize cycle for unifying the voltages on the individual cells if a predetermined number of recharge cycles have been performed, consisting of applying said high voltage to the battery for a period of time longer than that of the recharge cycle.

15. A method as defined in claim 14, in which the recharge cycle is repeated until the battery is fully charged, and in which the equalize cycle is performed by applying said high voltage to the battery following a last one of the recharge cycles for a second predetermined period of time which is longer than the first predetermined period of time.

16. A method for automatic control of battery maintenance as defined in claim 15, further including causing a first predetermined delay time period between successive repetitions of said recharge cycle.

17. A method for automatic control of battery maintenance as defined in claim 16, further including causing a second predetermined delay time period before said equalize cycle.

* * * * *

UNITED STATES PATENT AND TRADEMARK OFFICE
CERTIFICATE OF CORRECTION

PATENT NO. : 4,562,398

DATED : December 31, 1985

INVENTOR(S) : Paul Kotlarewsky

It is certified that error appears in the above-identified patent and that said Letters Patent is hereby corrected as shown below:

Figure 3 should be added as per attached sheet.

On the cover page, "2 Drawing Figures" should read
--3 Drawing Figures--.

Signed and Sealed this

Tenth Day of March, 1987

Attest:

DONALD J. QUIGG

Attesting Officer

Commissioner of Patents and Trademarks